United States Patent [19]

Swank

[11] Patent Number: 5,158,705
[45] Date of Patent: Oct. 27, 1992

[54] METHOD FOR PREPARING TIN OXIDE SOLS AND SOLS PREPARED THEREBY

[75] Inventor: Thomas F. Swank, Sudbury, Mass.

[73] Assignee: Nyacol Products, Inc., Ashland, Mass.

[21] Appl. No.: 815,507

[22] Filed: Jan. 2, 1992

[51] Int. Cl.⁵ .............................................. B01J 13/00
[52] U.S. Cl. ............................ 252/313.1; 252/315.01; 252/363.5; 252/309; 423/617; 423/618
[58] Field of Search ............ 252/313.1, 315.01, 363.5, 252/309; 423/617, 618

[56] References Cited

U.S. PATENT DOCUMENTS

| | | |
|---|---|---|
| 3,455,794 | 7/1969 | Passal et al. ........................ 204/54 |
| 3,462,373 | 8/1969 | Jongkind ............................. 252/313 |
| 3,888,788 | 6/1975 | Yates .................................... 252/309 |
| 4,594,182 | 6/1986 | Hashimoto et al. ............... 252/518 |
| 4,612,138 | 9/1986 | Keiser ............................... 252/313.2 |
| 4,746,459 | 5/1988 | Kaplan ............................. 252/313.1 |

Primary Examiner—Richard D. Lovering
Assistant Examiner—N. Bhat
Attorney, Agent, or Firm—Alvin Isaacs

[57] ABSTRACT

Disclosed is a method for preparing aqueous negatively charged tin oxide sols having substantially uniform particle size no greater than about 50 nm and preferably from about 5 to about 20 nm, the sols being characterized as being substantially free of any other reagents which may adversely affect contemplated usage as a catalyst.

20 Claims, No Drawings

METHOD FOR PREPARING TIN OXIDE SOLS AND SOLS PREPARED THEREBY

BACKGROUND OF THE INVENTION

Various ways of preparing tin oxide sols are well known in the art. For example, while not intended to be but a cursory survey of the state of the patent literature, the following patents are nevertheless believed to be representative.

$SnO_2$ sols have been prepared by electrodialysis (U.S. Pat. Nos. 3,723,273; 4,147,605; and 4,203,822); by treating alkali metal stannate with an acid to precipitate hydrated stannic oxide, washing to remove electrolytes, and peptizing the hydrated stannic oxide floc with potassium hydroxide or potassium stannate (U.S. Pat. Nos. 3,346,468 and 3,462,373); and treating alkali metal stannate with ion exchange resins (U.S. Pat. Nos. 3,455,794 and 3,888,788).

Nyacol Products Inc., assignee of the instant application, manufactures and sells a tin oxide sol under the trade name SN-20 prepared by ion exchange and which finds particular use as an additive to crude oil as a scavenger for metals that can adversely affect the petroleum cracking process.

In the preparation of this commercial product, a weak acid ion exchange resin is placed in a reactor, water added to form a slurry and thereafter adding to the slurry an aqueous solution of an alkali metal stannate. The stannate is deionized by the resin to precipitate out small particle size tin oxide. However, the particles grow to a larger particle size, e.g. on the order of 100 nm. The desired small particle size is then obtained by adding a proprietary additive and then heating and evaporating to the final desired concentration, e.g. 25.0±0.2@25° C., pH on the order of about 10.5, viscosity <10. While as heretofore alluded to, the foregoing commercial synthesis is entirely satisfactory for the preparation of a tin sol for use in the petroleum cracking process, the presence of the additive precludes its use in many other projected commercial applications. Thus, while the presence of such additives in the relatively "dirty" crude oil mix is of no consequence, in other applications envisioned for use it is.

Stated simply, the task of the present invention is to provide a method of preparing aqueous tin oxide sols having negatively charged $SnO_2$ particles which do not require the presence of any additive to provide a mean particle size no greater than about 50 nm and most preferably on the order of 5-20 nm.

BRIEF DESCRIPTION OF THE INVENTION

In accordance with this invention, the aforementioned task is solved in an elegant and cost-effective manner by the surprising discovery that the desired small particle size sol may be obtained simply by admixing the tin salt and the ion exchange resin slurry to deionize the salt and thereby form the tin oxide sol in such a manner as to maintain a substantially constant alkaline pH for the slurry, e.g. a pH of at least 8.0.

DETAILED DESCRIPTION OF THE INVENTION

As heretofore mentioned, the present invention is directed to small particle size tin oxide sols which are characterized as being free of additives which can adversely affect their use in certain commercial processes.

The concept of employing ion exchange resins to deionize a soluble stannate to precipitate out tin oxide in the preparation of tin oxide sols is per se known in the art. As examples of useful ion exchange resins for this purpose, as reported in the patent literature, mention may be made of weak acid cation exchange resins such as methacrylic acid-divinylbenzene copolymer, maleic anhydridestyrene-divinylbenzene copolymer, phenolcarboxylic acidformaldehyde condensate, diallylphosphonic acid resins, phosphonic acid or phosphinic acid of styrene-divinylbenzene copolymer, etc. Useful cation exchange resins of this description which are commercially available include IRC-84-S, IRC-50, Duolite 464, Ionic CC, IRC-84, and H-70.

Nyacol Products, Inc., assignee of this invention, has previously manufactured and sold a tin oxide sol for use in petroleum cracking processes, which sol was manufactured by deionizing an alkali metal stannate with a slurry of a weak acid cation exchange resin of the foregoing description, a resin of the IRC series (from Rohm & Haas), particularly IRC-84-S, being especially preferred. As previously stated, in order to obtain the desired small particle size tin oxide, a proprietary reagent is then incorporated into the sol.

While entirely satisfactory for the intended use, the presence of this additive precluded its use in certain other commercial processes, notably as a catalyst in various chemical syntheses.

In essence, the present invention may be said to be an improvement in the above-noted process for preparing tin oxide sols by deionizing a soluble stannate with a cation exchange resin and then concentrating, which process requires the presence of a stabilizer to provide the small particle size sol.

The novel process of this invention may be said to have its inception in the discovery that the particle size of the tin oxide particles in the contemplated synthesis is pH dependent, being inversely proportional to the pH of the slurry, i.e. the higher the pH, the smaller the particle size.

For this reason, in the aforementioned process for preparing $SnO_2$ tin oxide sol where the acid ion exchange resin is placed in the reactor and the alkaline alkali metal stannate then added, an acid to neutral pH is initially present, forming larger particles which require an additive to provide the smaller particles.

In contradistinction to the method for preparing SN-20 tin oxide sol, as previously described, in accordance with the present invention the particle size is controlled so as to provide a substantially constant alkaline pH of at least 8.0 and which is preferably at least 8.4 and which may be on the order of pH 10 or higher. The pH may be controlled simply by placing an aqueous solution of all of the tin salt for the particular batch operation in the reactor vessel and then adding the cation exchange resin slowly so as to slowly decrease the pH from an initial pH in excess of 10.0, e.g. on the order of 13.0, to a lower pH of 8.0 or higher.

However, it is preferred to place a small charge of resin slurry in the reactor vessel and then adding a small charge of the tin salt to initiate tin oxide formation at a pH of on the order of 8.5 to 10 and then immediately commencing slowly adding the remainder of the tin salt along with resin on an as needed basis to maintain a fairly constant pH of at least 8.0 and preferably at least 8.4. The pH may next be adjusted, if desired, by the addition of more resin to provide a sol which, after separation from the resin beads and concentrating will possess the particular desired alkaline pH.

The cation exchange resins which may be employed in the practice of this invention, such as those heretofore mentioned, are per se known in the art and there selection will be a matter of choice within the expected judgment of the skilled worker in the light of this description. Accordingly, they per se comprise no part of this invention.

The preferred tin salts contemplated by this invention are the alkali metal stannates, e.g. potassium, sodium or lithium stannate, including mixtures thereof, potassium stannate being particularly preferred.

The proportions of ingredients will at least in part be dependent upon the particular resin and salt selected. Accordingly, they are not capable of precise quantification. In any case, the most meaningful way to express the amounts to be employed so as to enable those skilled in the art to understand how to practice the invention has already been described with particularity, namely selecting the amount of tin salt to be converted to tin oxide sol, adding a small amount such as about 10 percent of the selected resin to the reactor, introducing a portion, e.g. about 20 percent of the salt so as to raise the pH of the mixture to at least 8.0 and thereafter adding the remainder of the salt and as much resin as is required for the amount of salt employed at a rate and in such a manner as to maintain a preselected substantially constant alkaline pH.

By way of illustration only, the ratio by volume of resin in cubic centimeters to weight of tin salt in grams to be employed may be on the order of from about 1:1 to about 1:3. In the preferred process where an initial small charge of each is placed in the reactor, substantially the same ratios may be employed. [Since it is more accurate to measure the resin by volume than by weight, it is preferred to express the ratios of amounts in terms of volume of resin to weight of tin salt rather than by weight to weight or volume to volume.]

The following examples show by way of illustration and not by way of limitation the novel synthesis of this invention.

EXAMPLE 1

1344 grams of water are placed in a beaker. The temperature is then brought up to about 55° C. and 384.9 grams of potassium stannate powder added with mixing for about fifteen minutes until dissolved. At this point, the pH of the stannate solution is about 12.2. IRC-84-S cation exchange resin was then added slowly to bring the pH down to about 8.5. This required about 170 cc of resin. The resulting sol was held at about the same elevated temperature and pH for about 30 minutes to provide a sol with a pH of 8.64. The sol was then separated from the resin, washed with water and concentrated to about 29.8% sol at a final pH of 11.3, viscosity of 19cps.

EXAMPLE 2

110 gallons of IRC-84-S cation exchange resin (from Rohm & Haas) were placed in a reactor. 480 gallons of water (about 4000 pounds) were then added and the resulting mixture agitated for about 10 minutes to form a slurry which was then heated to about 55° C. 500 pounds of potassium stannate powder were then added to raise the pH of the slurry to about 9.0. Immediately thereafter, and while maintaining the temperature at 55±3° C., a solution of about 1900 pounds of potassium stannate in 498 gallons of water was added at the rate of about 3 gallons per minute. While adding the potassium stannate solution, the pH of the mixture was maintained between 8.4 and 8.7, with the higher pH preferred, by the addition of more of the resin as needed. After the addition of the stannate was completed, the pH was adjusted to 7.9 to 8.1 by the further addition of resin. The sol was then drained from the reactor to separate it from the resin beads and the resin beads were then "backwashed" with water by first adding 100 pounds of water into the reactor in 25 pound increments, and while slowly agitating adding an additional 100 pounds of water in 25 pound increments. The aqueous mixture was then pumped into an evaporator at the rate of about 25–30 gallons per minute where it was concentrated and then cooled to provide a tin oxide sol having the following characteristics:

| | |
|---|---|
| $SnO_2$ by weight | 15% |
| Particle Size | 15 nm |
| Particle Charge | Negative |
| pH | 8.5 to 9.5 |
| Potassium by weight | 0.5% |
| Specific Gravity | 1.15 |
| Viscosity | 5 to 10 cps |

It is to be noted that the tin sols prepared according to this invention will contain a small amount by weight of cation from the tin salt, e.g. less than 1.0% by weight of potassium or other alkaline earth metal.

From the foregoing description it will thus be seen that the present invention provides a most viable method for forming small particle size tin sols which contain no stabilizers or other additives which could preclude its use in certain syntheses.

Since certain changes may be made without departing from the scope of the invention herein contemplated, it is intended that the matter contained in the foregoing specification, including the example, be taken as illustrative and not in a limited sense and that the scope of the invention be as defined in the appended claims.

What is claimed is:

1. The method for preparing aqueous negatively charged tin oxide sols having a particle size no greater than about 50 nm, which sols are substantially free of any additives, comprising the step of reacting a tin salt and a cation exchange resin in an aqueous medium to deionize the salt and thereby form tin oxide, the reaction being performed while maintaining a substantially constant alkaline pH of at least 8.0.

2. A process as defined in claim 1 wherein the tin salt is a stannate.

3. A process as defined in claim 1 wherein the tin salt is an alkaline earth metal stannate.

4. A process as defined in claim 1 wherein the pH during reaction of the tin salt and resin is maintained between about 8.4 and about 10.0.

5. A process as defined in claim 1 wherein the resin is a weak acid cation exchange resin.

6. A method as defined in claim 1 wherein the constant alkaline pH is maintained by initially placing an aqueous solution of the tin salt in a reactor and thereafter slowly adding the resin so as to slowly decrease the pH to a lower pH of 8.0 or higher.

7. A method as defined in claim 6 wherein the aqueous tin sol formed by the reaction is thereafter separated from the resin and concentrated to the desired percentage by weight of tin oxide.

8. The method of preparing an aqueous negatively charged small particle size tin oxide sol comprising the steps of:
 (a) placing a small charge of an aqueous slurry of a weak acid cation resin in a reactor;
 (b) adding a small quantity of a water-soluble tin salt to the reactor to initiate tin oxide formation at a pH of at least 8.0;
 (c) substantially immediately after the addition of the tin salt begin slowly adding an aqueous solution of the remainder of the tin salt to be reacted along with additional weak acid cation exchange resin as needed to maintain a substantially constant pH; and
 (d) thereafter separating the resulting aqueous tin oxide sol from the resin.

9. A method as defined in claim 8 including the step of concentrating the sol by removal of water until the desired percentage by weight of tin oxide in the sol is obtained.

10. A method as defined in claim 9 wherein a further amount of the ion exchange resin is added to the mixture before separation and concentration in order to adjust the pH lower in order to provide a sol which, after concentration, will possess a particular desired alkaline pH.

11. A method as defined in claim 9 wherein the tin salt is an alkaline earth metal stannate.

12. A negatively charged tin oxide sol prepared by the method of claim 1.

13. A tin oxide sol as defined in claim 12 wherein the tin salt employed to prepare the sol is potassium stannate and the sol contains a small amount by weight of potassium.

14. A tin oxide sol as defined in claim 12 wherein the tin oxide particles are between about 5 and about 20 nm.

15. An aqueous tin oxide sol wherein the sol is negatively charged, contains no additives which can adversely affect its use as a catalyst, and the tin oxide possesses a particle size less than 50 nm.

16. An aqueous tin oxide sol as defined in claim 15 wherein the particle size of the tin oxide is between about 5 and about 20 nm.

17. An aqueous tin oxide sol as defined in claim 16 wherein the pH of the sol is above pH 8.0.

18. An aqueous tin oxide sol as defined in claim 15 wherein the pH is from about 8.5 to about 9.5.

19. An aqueous tin oxide sol as defined in claim 18 wherein the viscosity of the sol is between about 5 and about 10 cps.

20. An aqueous tin oxide sol as defined in claim 16 wherein the sol contains less than 1.0 percent by weight of potassium.

* * * * *